United States Patent
Cho et al.

(10) Patent No.: US 7,471,812 B2
(45) Date of Patent: Dec. 30, 2008

(54) FINGERPRINT SYMMETRY AXIS EXTRACTION METHOD AND FINGERPRINT RECOGNITION METHOD USING FINGERPRINT SYMMETRY AXIS

(75) Inventors: Sang Hyun Cho, Seoul (KR); Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 824 days.

(21) Appl. No.: 11/086,872

(22) Filed: Mar. 21, 2005

(65) Prior Publication Data

US 2005/0207625 A1  Sep. 22, 2005

(30) Foreign Application Priority Data

Mar. 22, 2004  (KR) .................. 10-2004-0019391

(51) Int. Cl.
*G06K 9/00* (2006.01)
(52) U.S. Cl. ...................... 382/125; 382/124
(58) Field of Classification Search .............. 382/125
See application file for complete search history.

(56) References Cited

U.S. PATENT DOCUMENTS

| | | | | |
|---|---|---|---|---|
| 4,747,147 A * | 5/1988 | Sparrow | ...................... | 382/125 |
| 4,827,527 A * | 5/1989 | Morita et al. | ................ | 382/127 |
| 5,040,224 A * | 8/1991 | Hara | ...................... | 382/124 |
| 5,140,642 A * | 8/1992 | Hsu et al. | ................ | 382/124 |
| 5,142,592 A * | 8/1992 | Moler | .................... | 382/200 |
| 5,337,369 A * | 8/1994 | Shibuya | ...................... | 382/125 |
| 5,363,453 A * | 11/1994 | Gagne et al. | ............... | 382/125 |
| 5,497,429 A * | 3/1996 | Shibuya | ...................... | 382/125 |
| 5,610,993 A * | 3/1997 | Yamamoto | .................. | 382/124 |
| 5,613,013 A * | 3/1997 | Schuette | ..................... | 382/124 |
| 5,631,972 A * | 5/1997 | Ferris et al. | ................ | 382/125 |
| 5,680,481 A * | 10/1997 | Prasad et al. | ................ | 382/190 |
| 5,748,766 A * | 5/1998 | Maase et al. | ................ | 382/124 |
| 5,825,907 A * | 10/1998 | Russo | ....................... | 382/124 |
| 5,848,176 A * | 12/1998 | Hara et al. | .................. | 382/124 |
| 6,031,942 A * | 2/2000 | Nakayama | .................. | 382/284 |
| 6,633,655 B1 * | 10/2003 | Hong et al. | ................ | 382/118 |
| 6,766,040 B1 * | 7/2004 | Catalano et al. | ............. | 382/115 |
| 6,826,295 B2 * | 11/2004 | Lichtermann et al. | ....... | 382/124 |
| 2002/0034322 A1 * | 3/2002 | Lichtermann et al. | ....... | 382/124 |
| 2004/0107301 A1 * | 6/2004 | Sato et al. | ....................... | 710/1 |
| 2004/0161135 A1 * | 8/2004 | Sano et al. | ................... | 382/124 |
| 2008/0021502 A1 * | 1/2008 | Imielinska et al. | ............. | 607/1 |

FOREIGN PATENT DOCUMENTS

| | | |
|---|---|---|
| EP | 0478442 | 4/1992 |
| JP | 04-247582 | 9/1992 |
| JP | 08161489 A * | 6/1996 |
| JP | 08279039 A * | 10/1996 |
| JP | 09147113 A * | 6/1997 |
| JP | 2001-076142 | 3/2001 |
| WO | WO 0235453 | 5/2002 |

\* cited by examiner

*Primary Examiner*—Matthew C. Bella
*Assistant Examiner*—Sath V. Perungavoor
(74) *Attorney, Agent, or Firm*—Lee, Hong, Degerman, Kang & Waimey

(57) ABSTRACT

A fingerprint symmetry axis extraction method is provided. The method includes detecting a core point of a fingerprint, setting imaginary symmetry axes intersecting the core point, and extracting an actual fingerprint symmetry axis from the imaginary symmetry axes. The actual fingerprint symmetry axis is one that can provide the largest symmetry measure being obtained between ridge range directions in paired blocks facing each other.

20 Claims, 3 Drawing Sheets

■: Core point $\alpha = \frac{\pi}{n}$, $\theta_i = (i \bmod n) \times \alpha$, $i=0,\ldots,n-1$

FINGERPRINT SYMMETRY AXIS EXTRACTION METHOD AND FINGERPRINT RECOGNITION METHOD USING FINGERPRINT SYMMETRY AXIS

CROSS-REFERENCE TO RELATED APPLICATIONS

Pursuant to 35 U.S.C. § 119(a), this application claims the benefit of earlier filing date and right of priority to Korean Application No. 1939/2004, filed on Mar. 22, 2004, the contents of which is hereby incorporated by reference herein in their entirety.

BACKGROUND OF THE INVENTION

1. Field of the Invention

The present invention relates to a fingerprint recognition method, and more particularly, to a fingerprint symmetry axis extraction method and a fingerprint recognition method using the fingerprint symmetry axis, which can improve the accuracy of the fingerprint recognition by extracting a symmetry axis from a fingerprint. The present invention further relates to a fingerprint symmetry axis extraction method that can extract a fingerprint symmetry axis using a ridge range direction of each block included in a fingerprint image and to a fingerprint recognition method using the extracted fingerprint symmetry axis.

2. Description of the Related Art

In recent years, a retina, an iris, a vein, a face, and a fingerprint have been used as personal authentication means. Among them, the fingerprint has been widely used as it can provide high authentication reliability and stability and high recognition speed.

In a related art fingerprint recognition system, feature vectors used for fingerprint classification and personal authentication become information such as relative distance and angle with respect to a standard. The feature vectors are a combination of a core point, an ending point, bifurcation points of each ridge defining the fingerprint. By comparing the feature vectors with each other, the coincidence of the fingerprints is determined.

However, since the feature vectors for the fingerprint recognition are highly affected by a fingerprint inputting state that may vary depending on moisture, finger slip, finger press states and fingerprint input angle, the fingerprint recognition may be deteriorated.

Accordingly, in order to accurately recognize the fingerprint, specific reference information that is not varied even by the fingerprint inputting state and the fingerprint input angle is required. That is, specific fingerprint information that is not varied according to the user's fingerprint inputting state is required.

Particularly, when a user contacts his/her finger on a photographing device in a state where the finger is inclined, since the fingerprint image is inputted in a state where it is rotated, it is difficult to determine the coincidence and there may be a recognition error.

SUMMARY OF THE INVENTION

Accordingly, the present invention is directed to a fingerprint symmetry axis extraction method and a fingerprint recognition method using the fingerprint symmetry axis that substantially obviate one or more problems due to limitations and disadvantages of the related art.

An object of the present invention is to provide a fingerprint symmetry axis extraction method that can extract inherent symmetry axis information of each fingerprint regardless of a ridge thickness and to a fingerprint recognition method using the extracted fingerprint symmetry axis.

Another object of the present invention is to provide a fingerprint symmetry axis extraction method and a fingerprint recognition method that can improve the accuracy of the fingerprint recognition by determining the coincidence of the fingerprint using a fingerprint symmetry axis as a factor.

A still another object of the present invention is to provide a fingerprint symmetry axis extraction method that can accurately extract a fingerprint symmetry axis and to a fingerprint recognition method using the extracted fingerprint symmetry axis.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a fingerprint symmetry axis extraction method, including: detecting a core point of a fingerprint; setting imaginary symmetry axes intersecting the core point; and extracting an actual fingerprint symmetry axis from the imaginary symmetry axes, the actual fingerprint symmetry axis providing the largest symmetry measure between ridge range directions in paired blocks facing each other.

In another aspect of the present invention, there is provided a fingerprint recognition method, including: scanning a fingerprint image; extracting a fingerprint symmetry axis by which a symmetry measures between ridge range directions of the scanned fingerprint image becomes maximum; and performing an authentication for the scanned fingerprint image with reference to the extracted fingerprint symmetry axis.

In a still another aspect of the present invention, there is provided a fingerprint recognition method comprising: calculating first and second sums, the first sum being obtained by summing angles of ridge range direction of paired blocks facing each other with reference to first imaginary symmetry axes and the second sum being obtained by adding an absolute value that is obtained by subtracting the first sum from a predetermined threshold value with respect to all of the blocks; and performing an authentication by selecting one of the first imaginary symmetry axes, which has the smallest second sum.

According to the present invention, since the fingerprint symmetry axis is uniformly maintained without depending on the external environment, the fingerprint recognition can be more accurately performed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
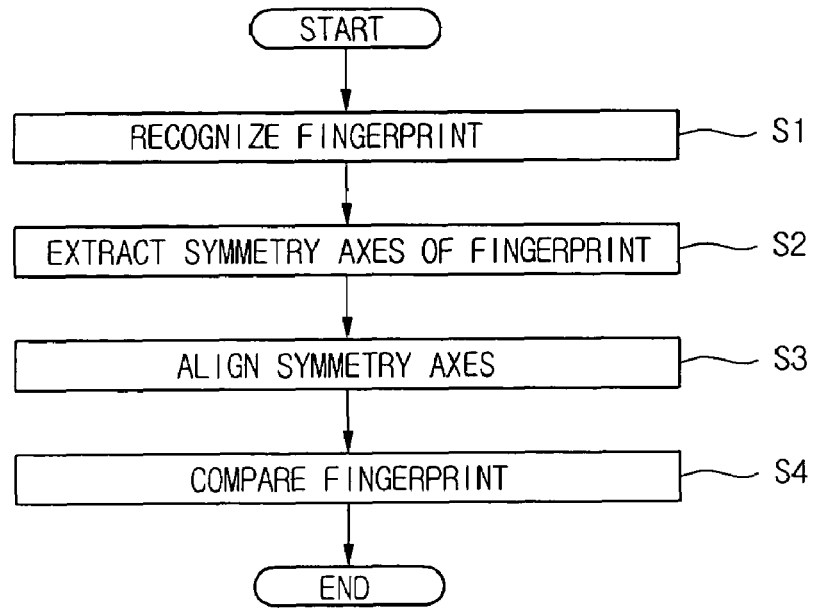
FIG. 1 is a flowchart illustrating a fingerprint recognition method according to an embodiment of the present invention.

FIG. 1 shows a flowchart illustrating a fingerprint recognition method according to an embodiment of the present invention.

Referring to FIG. 1, in the inventive fingerprint recognition method, an image of a fingerprint to be recognized is first captured by, for example, a photographing process (S1). Then, after the fingerprint image is accurately obtained through a binary coding process, a thinning process, and the like, fingerprint symmetry axes are extracted (S2). The symmetry axes of the currently recognized fingerprint are aligned according to a predetermined reference (S3). At this point, the symmetry axes and the feature vectors are compared with each other to determine the coincidence of the fingerprint (S4).

In the operation of extracting the fingerprint symmetry axes (S2), it is preferable that the feature vectors of the fingerprint are extracted together therewith and the binary coding and thinning processes can be performed according to the technology well known in the art. The aligning process (S3) is performed to compensate for the rotational angle of the fingerprint image, which is rotated by external causes when the current fingerprint image is inputted, to align the symmetry axes. For example, the fingerprint image is compensated for so that the symmetry axes are aligned in a vertical direction.

As described above, the symmetry axes of the fingerprint function to compensate for a rotational angle error incurred when the fingerprint is inputted. That is, the rotational angle of the fingerprint image is compensated for by the symmetry axes.

In addition, the symmetry axes of the fingerprint function as a reference when it is determined if the inputted fingerprint image coincides with that stored in the database. That is, when the inputted fingerprint is compared with a fingerprint stored in a database, the symmetry axes function as a determining reference together with the feature vectors. For example, when it is unclear if the feature vectors of the inputted fingerprint image coincide with those of the fingerprint image stored in the database.

The fingerprint symmetry axis extraction method will be described hereinafter in more detail.

Figure 2:
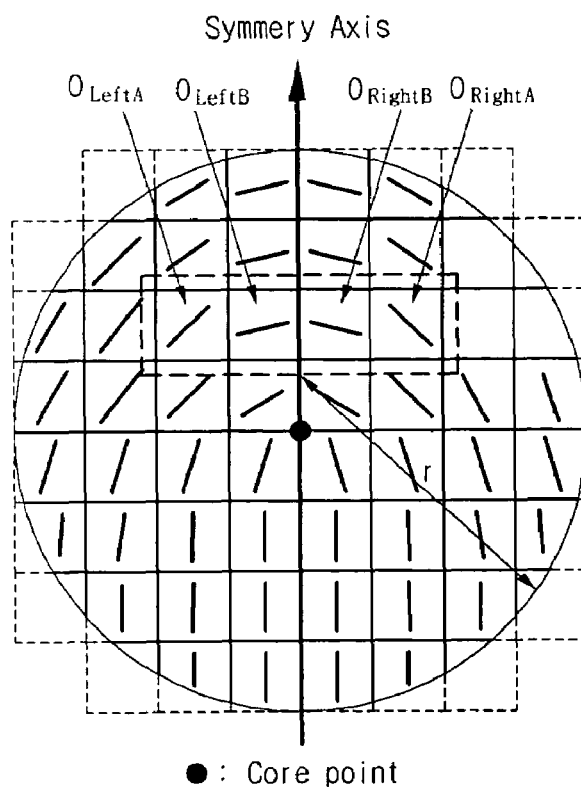
FIG. 2 is a view of blocks in an area near a core point of a fingerprint and a ridge range direction of each block in a fingerprint symmetry axis extraction method according to an embodiment of the present invention.

FIG. 2 is a view of blocks in an area near a core point of the fingerprint and a ridge range direction of each block in a fingerprint symmetry axis extraction method according to an embodiment of the present invention.

Referring to FIG. 2, there is shown blocks defined in a circle area defined by a radius about a core point and a ridge range direction is shown in each block. The core point can be drawn by any well-known methods in the art. Furthermore, the ridges in the circle area defined by a radius r about the core point are formed in a semi-oval-shape. When the ridge range direction in each block is calculated after the circle area is divided into the blocks each having a predetermined size, as shown in FIG. 2, the ridge range direction of the fingerprint is appeared in each block. At this point, for example, the radius can be 64-pixel in a pixel unit and the block size can be 16*16-pixel. Among the blocks each intersecting the rim of the circle area, only the blocks that are included in the circle area by a half of the size thereof are used in extracting the symmetry axes.

Figure 3:
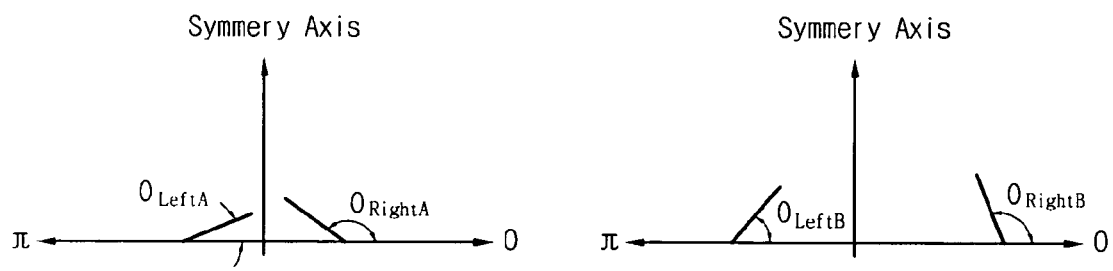
FIG. 3 is a view illustrating a comparison of ridge range directions with respect to a symmetry axis in a fingerprint symmetry axis extraction method according to an embodiment of the present invention.

FIG. 3 illustrates a comparison of ridge range directions with respect to a symmetry axis in a fingerprint symmetry axis extraction method according to an embodiment of the present invention.

Referring to FIG. 3, there is shown a pair of ridge range directions $O_{left\_A}$ and $O_{right\_A}$ of two blocks facing each other and spaced away from the symmetry axis by an identical distance. When a vertical axis in FIG. 3 is a symmetry axis with respect to the facing blocks, an angle $(O_{left\_A}+O_{right\_A})$ obtained by adding an angle defined by the ridge range direction $O_{left\_A}$ of the vertical block disposed on the left side of the symmetry axis to an angle defined by the ridge range direction $O_{right\_A}$ of the symmetry block disposed on the right side of the symmetry axis will be π. Likewise, an angle $(O_{left\_B}+O_{right\_B})$ will be also π. This is, as stated in the forgoing description, obtained by assuming that the ridge range direction of the fingerprint is formed in an almost semi-oval-shape. Although the ridge range direction is not formed the exact semi-o al-shape, since the pattern of the fingerprint ridge range is similar to the oval-shape by which both sides thereof are symmetrical about a predetermined symmetry line, a sole symmetry axis can be obtained from the ridge range of the fingerprint.

As described above, when the angles defined by the ridge range direction of the both blocks symmetrically spaced away from the symmetry axis by an identical distance within an area about the core point are added to each other, the added angel becomes almost π. Using this feature of the fingerprint ridge range, a symmetry measure S(θ) with respect to an angle θ for extracting the symmetry axis can be defined by the following equation 1.

$$S(\theta) = 1 - \frac{\frac{2}{N}\sum_{m=1}^{N/2}|\pi - (O_{Left_A} + O_{Right_A})|}{\pi} \quad \text{Equation 1}$$

where, N is the number of blocks contained in an area defined by a radius r about the core point;

m is an index of a block direction field; and $O_{Left\_A}+O_{Right\_A}$ is a ridge range direction in each block.

The symmetry axis extraction method using the symmetry measure S(θ) defined by the equation 1 will be described hereinafter.

When a selected symmetry axis is the accurate symmetry axis, the sum of the angles defined by the facing ridge range directions of the pair of blocks will be π. Therefore, the sum π of the angles defined by the facing ridge range directions of the pair of blocks from π will be 0. However, it can be noted that when the angle sum is not π, a small value higher than 0 will be deduced.

The sum of the angles defined by the pair of facing ridge range direction is obtained for all of the blocks contained in the circle area defined by the radius r about the core point and the absolute value is obtained the absolute as a whole.

After the angles of the ridge range directions of all blocks are summed up, the sum is divided by the number of blocks, and then is again divided by π. The resulting value can be determined as a first value indicating a uniform symmetry measure with respect to the ridge range direction of the block. When the selected symmetry axis is ideal, the first value will be 0. Therefore, when the first value is subtracted from 1, the symmetry measure becomes 1.

On the bases of the above-described ground, it becomes possible to calculate all symmetry measures of an selected imaginary symmetry axis and let a symmetry axis defined by one of the symmetry measures, which is closest to 1, be a symmetry axis of the fingerprint. In addition, a process for more accurately extracting the symmetry axis may be selectively further performed.

The symmetry axis extraction process will be described below in more detail.

First, a core point detecting process is performed. This process can be performed in the course of comparing the ridge range directions. However, the present invention is not limited to this. The process may be performed by technologies well known in the art.

Figure 4:
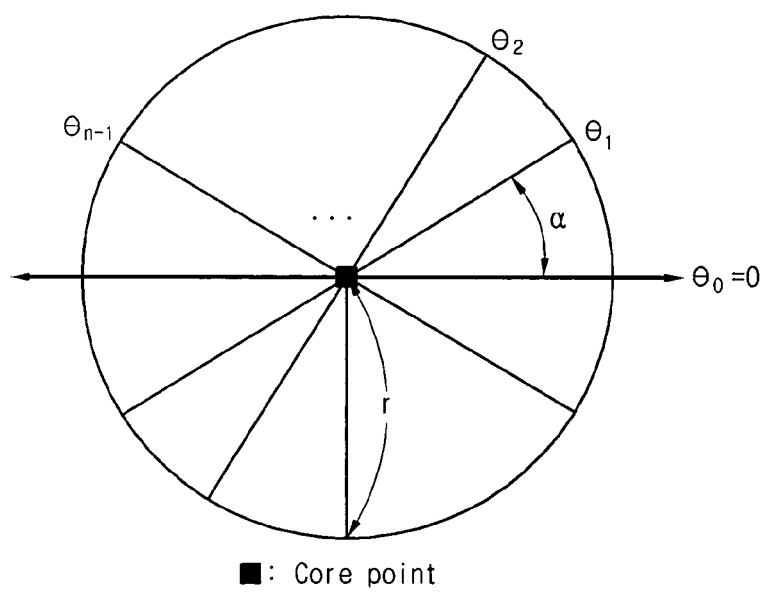
FIG. 4 is a view illustrating a comparison of imaginary symmetry axes with reference to a core point.

After the above, imaginary symmetry axes $\theta_0, \theta_1, \theta_2, \ldots \theta_{n-1}$ that are formed by dividing a circle area having a radius r about the core point by an equal angle within a range of 0-π. The circular area where the imaginary symmetry axis about the core point is represented is illustrated in FIG. 4.

Next, a most symmetrical axis among the n symmetry axes $\theta_0, \theta_1, \theta_2, \ldots \theta_{n-1}$ is extracted using the following equation 2.

$$\max_{i \in (0, \ldots, n-1)} \{S(\theta_i)\} \quad \text{Equation 2}$$

The equation 2 is for extracting the largest value. That is, the equation 2 is for extracting an axis having the largest symmetry measure $S(\theta)$ among the imaginary symmetry axes $\theta_0, \theta_1, \theta_2, \ldots \theta_{n-1}$. For example, the symmetry axis $S(\theta)$ is a value between 0-1. When the symmetry axis $S(\theta)$ is 1, this means that the sum of the angles defined by the ridge range directions in the paired facing blocks becomes 180°. That is, the selected symmetry axis is the exact symmetry axis. In addition, as the deviation of the sum of the angles defined by the ridge range directions in the paired facing blocks from 180° is increased, the possibility that the selected symmetry axis becomes a symmetry axis of the fingerprint is decreased. That is, a symmetry axis having the most high symmetry measure closer to 1 is extracted as the symmetry axis of the fingerprint.

When a process for more accurately extracting the symmetry axis of the fingerprint is further performed, the following equation 3 may be used.

$$\max_{\substack{l \in (-(\alpha-1), -(\alpha-1)+\alpha') \ldots \\ ((\alpha-1)-\alpha'), (\alpha-1))}} s(\theta+l) \quad \text{Equation 3}$$

where, θ is an angle most reflecting the symmetry property extracted by the equation 2; and a' is an angle variation for extracting an accurate symmetry axis.

Figure 5:
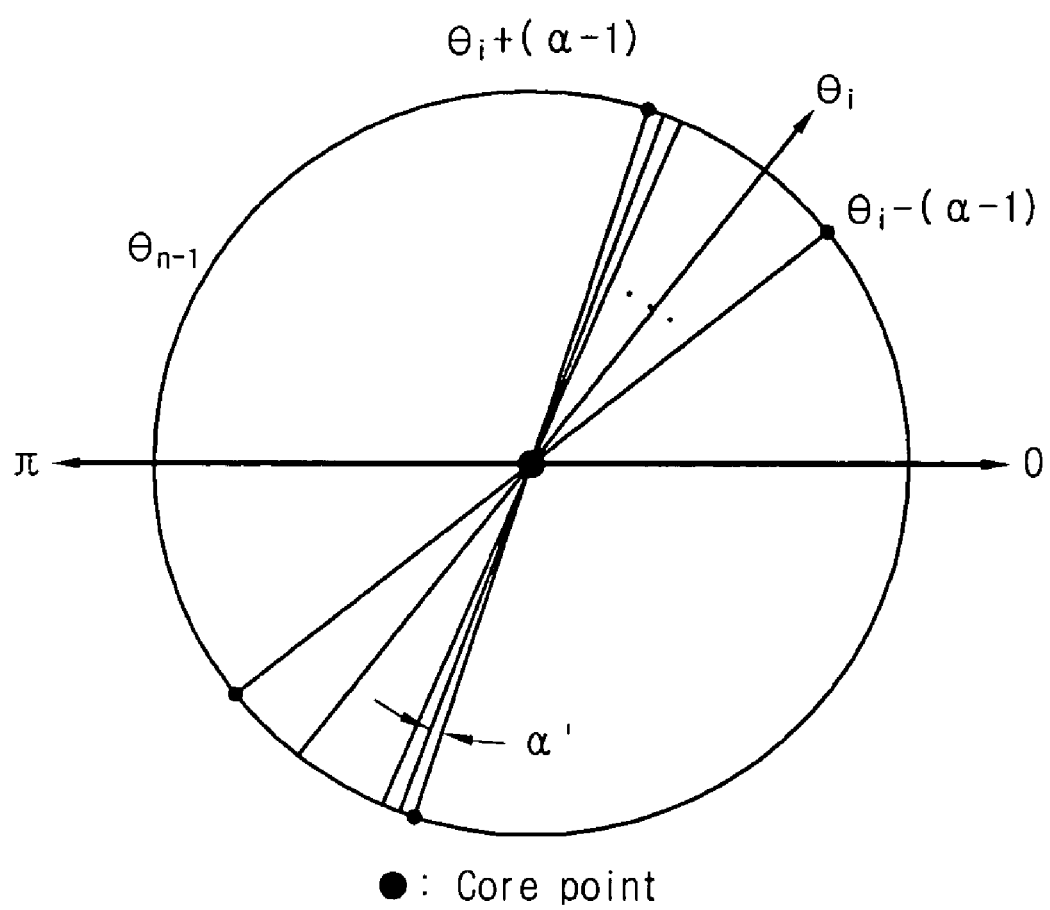
FIG. 5 is a view of a process for thinly extracting a symmetry axis in a fingerprint symmetry axis extraction method according to an embodiment of the present invention.

FIG. 5 illustrates a process for thinly extracting a symmetry axis in a fingerprint symmetry axis extraction method according to an embodiment of the present invention.

The process for thinly extracting a symmetry axis will be described hereinafter with reference to FIG. 5 and Equation 3.

The equation 3 illustrates a process for extracting a symmetry axis having the largest symmetry measure from the surrounding of the symmetry axis extracted from the equation 2 while gradually increasing the a' by a variation value. The symmetry axis having the largest symmetry measure, which is extracted from the equation 3, may be considered as the accurate symmetry axis. Here, the equal angle a' may be 1°. At this point, an angle difference between the accurate symmetry axis of the fingerprint and the extracted symmetry axis may be in a range of ±0.5°.

The fingerprint symmetry axis extracted according to the above-described process is not affected by external environment such as image flaws when the fingerprint is scanned. Therefore, since the fingerprint rotation information can be compensated for, the symmetry axis can be used as reference information for the fingerprint classification and the fingerprint authentication work.

According to the present invention, the more accurate fingerprint symmetry axis can be extracted. As a result, the fingerprint recognition can be more accurately realized.

Furthermore, since the fingerprint symmetry axis is uniformly maintained without depending on the external environment, the fingerprint recognition can be more accurately performed.

In addition, even when the fingerprint image is inputted in a state where it is rotated, since the rotation is compensated for, the comparison process between the inputted fingerprint and the fingerprint stored in the database can be accurately performed.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A fingerprint symmetry axis extraction method comprising:

detecting a core point of a fingerprint;

setting imaginary symmetry axes intersecting the core point; and extracting an actual fingerprint symmetry axis from the imaginary symmetry axes, the actual fingerprint symmetry axis providing the largest symmetry measure between ridge range directions in paired blocks along the symmetry axis facing each other.

2. The fingerprint symmetry axis extraction method according to claim 1, wherein the blocks are contained in a predetermined circle area about the core point.

3. The fingerprint symmetry axis extraction method according to claim 1, wherein the imaginary symmetry axes are angularly spaced by an equal angle.

4. The fingerprint symmetry axis extraction method according to claim 1, further comprising extracting a more accurate fingerprint symmetry axis while thinly moving the actual symmetry axis by a minute angle.

5. The fingerprint symmetry axis extraction method according to claim 1, wherein the imaginary axes are formed within a range of 0–π.

6. The fingerprint symmetry axis extraction method according to claim 1, wherein the symmetry measure of the paired facing blocks is largest when a sum of angles defined by the ridge range directions in the paired facing blocks is π.

7. The fingerprint symmetry axis extraction method according to claim 1, wherein the symmetry measure is determined for all of the blocks identically distant from the imaginary symmetry axes.

8. The fingerprint symmetry axis extraction method according to claim 1, wherein the symmetry measure is determined as a single value that is the sum of symmetry measures of the facing blocks.

9. The fingerprint symmetry axis extraction method according to claim 1, wherein the block is 16*16-pixel in a size.

10. A fingerprint recognition method comprising:
    scanning a fingerprint image;
    extracting a fingerprint symmetry axis by which a symmetry measured between ridge range directions along the symmetry axis of the scanned fingerprint image becomes maximum; and
    performing an authentication for the scanned fingerprint image with reference to the extracted fingerprint symmetry axis.

11. The fingerprint recognition method according to claim 10, wherein the fingerprint symmetry axis becomes a reference for compensating rotation of the fingerprint image when the fingerprint image is inputted in a state where it is rotated.

12. The fingerprint recognition method according to claim 10, wherein an acceptance or rejection of the scanned fingerprint is determined whether feature vectors and the fingerprint symmetry axis are identical or not.

13. The fingerprint recognition method according to claim 10, wherein the number of the fingerprint symmetry axis is 1 for each fingerprint.

14. The fingerprint recognition method according to claim 10, wherein the authentication is performed by comparing feature vectors with each other after the symmetry axis of the fingerprint is co-aligned.

15. A fingerprint recognition method comprising:
    calculating first and second sums, the first sum being obtained by summing angles of ridge range direction of paired blocks facing each other with reference to first imaginary symmetry axes, the second sum being obtained by adding an absolute value that is obtained by subtracting the first sum from a predetermined threshold value with respect to all of the blocks; and
    performing an authentication by selecting one of the first imaginary symmetry axes, which has the smallest second sum.

16. The fingerprint recognition method according to claim 15, wherein the predetermined threshold values is π.

17. The fingerprint recognition method according to claim 15, wherein the first sum is less than π.

18. The fingerprint recognition method according to claim 15 wherein the blocks are arranged within a circle area having a predetermined radius from a core point of a fingerprint image.

19. The fingerprint recognition method according to claim 15, wherein the first imaginary symmetry axes are arranged intersecting a core point of a fingerprint image and angularly distant from each other by a predetermined first angle with reference to the core point.

20. The fingerprint recognition method according to claim 19, wherein second imaginary symmetry axes are further arranged intersecting the core point and distant from each other by a predetermined second angle after the first imaginary symmetry axes are arranged, the second angle being less than the first angle.

* * * * *